United States Patent
Erinle

(10) Patent No.: US 12,395,506 B2
(45) Date of Patent: *Aug. 19, 2025

(54) HOME-BASED PHYSICAL AND CYBER INTEGRATED SECURITY—INTRUSION DETECTION SYSTEM (PCIS-IDS)

(71) Applicant: Olugbenga Erinle, Laurel, MD (US)

(72) Inventor: Olugbenga Erinle, Laurel, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 18/636,129

(22) Filed: Apr. 15, 2024

(65) Prior Publication Data

US 2024/0406194 A1    Dec. 5, 2024

Related U.S. Application Data

(63) Continuation of application No. 16/027,241, filed on Jul. 3, 2018, now Pat. No. 11,962,604.

(60) Provisional application No. 62/528,322, filed on Jul. 3, 2017.

(51) Int. Cl.
| | | |
|---|---|---|
| *H04L 9/40* | (2022.01) | |
| *G06F 16/22* | (2019.01) | |
| *G08B 13/00* | (2006.01) | |
| *H04W 12/12* | (2021.01) | |

(52) U.S. Cl.
CPC ...... *H04L 63/1416* (2013.01); *H04L 63/1425* (2013.01); *G06F 16/22* (2019.01); *G08B 13/00* (2013.01); *H04W 12/12* (2013.01)

(58) Field of Classification Search
CPC . H04L 63/1416; H04L 63/1425; G06F 16/22; G08B 13/00; H04W 12/12
See application file for complete search history.

(56) References Cited

U.S. PATENT DOCUMENTS

| | | |
|---|---|---|
| 7,315,518 B1 | 1/2008 | Siegrist |
| 9,712,549 B2 * | 7/2017 | Almurayh ........... H04L 63/1425 |
| 10,375,572 B2 * | 8/2019 | Achim .................... H04L 67/02 |
| 10,432,658 B2 | 10/2019 | Back et al. |
| 10,505,959 B1 | 12/2019 | Wang et al. |
| 10,650,652 B1 | 5/2020 | Weignart et al. |
| 2006/0107321 A1 | 5/2006 | Tzadikario |
| 2011/0133930 A1 | 6/2011 | Blum |
| 2013/0049950 A1 | 2/2013 | Wohlert |
| 2014/0025337 A1 * | 1/2014 | Blount ................. G05B 19/406 |
| | | 702/183 |
| 2014/0165207 A1 * | 6/2014 | Engel .................... G06F 21/566 |
| | | 726/25 |
| 2016/0234232 A1 | 8/2016 | Poder et al. |
| 2016/0255104 A1 | 9/2016 | Eslambolchi et al. |
| 2017/0124834 A1 | 5/2017 | Pedersoli et al. |
| 2018/0020015 A1 | 1/2018 | Munro et al. |

(Continued)

*Primary Examiner* — Ali S Abyaneh
(74) *Attorney, Agent, or Firm* — Wood IP LLC; Theodore A. Wood

(57) ABSTRACT

Provided is an integrated physical security and cyber security intrusion and anomaly detection method for determining physical or electronic ingress/egress of a person/device and/or data/information from a home/facility/premise. The method includes processing data and information obtained from physical security system sensors, wired/wireless network traffic, and third-party sources, and creating sensor and network traffic profile, baselines and detecting anomalies and writing all related data to either a local database or a remotely managed database at a monitoring center.

15 Claims, 3 Drawing Sheets

(56) References Cited

U.S. PATENT DOCUMENTS

2018/0131716 A1\* 5/2018 Chantz ................ H04L 63/1425
2018/0191729 A1   7/2018 Whittle et al.
2019/0052676 A1\* 2/2019 Giokas .................. H04W 12/08
2019/0121714 A1\* 4/2019 Gross ...................... G06F 21/55

\* cited by examiner

HOME-BASED PHYSICAL AND CYBER INTEGRATED SECURITY—INTRUSION DETECTION SYSTEM (PCIS-IDS)

CROSS-REFERENCE TO RELATED APPLICATIONS

This application is a continuation of U.S. application Ser. No. 16/027,241, filed Jul. 3, 2018, which claims the benefit of U.S. Provisional Patent Application No. 62/528,322 filed Jul. 3, 2017, both of which are incorporated herein by reference in its entirety.

TECHNICAL FIELD

The present invention generally relates to security systems. Particularly, the present invention relates to physical security and cyber security systems.

BACKGROUND

Home physical security systems are well known. They monitor activity at ingress and egress points as well as other physical phenomena such as the presence of excessive heat, smoke and carbon monoxide. They also communicate status and condition information related to the same to a monitoring station over plain old telephone system (POTS), cellular networks or data networks.

Home physical security systems also allow the monitoring center to perform certain reset operations remotely over those networks. Most alarm systems are often limited to POTS or cellular network options with recent systems only just beginning to leverage the high-bandwidth ubiquitous data networks available within homes/facilities/premises and via broadband services.

Computer networks are also well known and, when deployed in homes, or facilities and other premises, are often comprised of wired and wireless connections to personal computers, printers, storage devices, smartphones, tablet computers, personal communications, and devices such as televisions, cameras, baby monitors and other internet-of-things-related devices.

Conventional computer networks typically include a router or gateway connection to an internet service provider to enable remote connectivity and computer communications capabilities-mostly for utilitarian purposes related to business, education, financial, industrial or other personal use.

The ubiquitous nature of wireless communications and networked connectivity, and the resulting explosion in the number of connected devices across the world, is driving broader employment of computer and device networks. These computers and network devices (or the Internet of Things—IoT) support automation, safety and security systems. The number IoT devices is forecasted by some to be more than 50 billion by 2020. This ubiquity and resulting lower connectivity costs, especially associated with internet protocol-enabled networks, has created significant security vulnerabilities in networked systems.

Cyber-attacks, and their levels of sophistication, are increasing across the world with businesses, governments and industrial facilities being the typical targets. Recently, home-based networks have begun to be used by hackers as platforms to launch their attacks.

For example, in October 2016 a distributed denial of service (DDoS) cyber-attack was launched on Dyn, a large global domain name system (DNS) service provider using a botnet. By way of background, a botnet includes several Internet connected devices running certain software or scripts that essentially turns them into internet robots.

The 2016 Dyn attack was comprised of up to 10 million internet connected devices such as printers, televisions, IP cameras, residential gateways, baby monitors and other IoT devices that had been infected with malware. This Dyn attack makes clear that the intrusion threat to homes/facilities/premises is no longer merely physical, such as addressed by typical alarm systems, but also cyber in nature.

SUMMARY

Given the aforementioned deficiencies, a need exists for methods and systems to address the security of systems, homes, facilities and premises.

Embodiments of the present invention provide methods and systems for a security/intrusion detection system. In particular, needed are methods and systems that integrate physical security and cyber security of home/facility/premise networks with a security sensor gateway, a remote monitoring station or security operations center for monitoring, alerting, triage and defense related to security incidents. In the embodiments, the networks can include personal computers, smartphones, tablet computers, personal communications, device networks, internet of things and all other related network devices.

Under certain circumstances, an embodiment of the present invention provides an integrated physical security and cyber security intrusion and anomaly detection method for determining physical or electronic ingress/egress of a person or data/information from a home/facility/premise. The method includes processing data and information obtained from physical security system sensors, wired/wireless network traffic, and third-party sources and creating sensor and network traffic profile. The method also includes providing baselines and detecting anomalies and writing all related data to either a local database or a remotely managed database at a monitoring center.

Additional embodiments include an integrated physical security and cyber security intrusion and anomaly detection method for determining physical or electronic ingress/egress of a person or data/information from a home/facility/premise. The system is configured for processing data and information obtained from physical security system sensors, wired, wireless network traffic, and third-party sources. The system is also configured for creating sensor and network traffic profile, baselines and detecting anomalies and writing all related data to either a local database or a remotely managed database at a monitoring center.

Yet another embodiment includes a security sensor gateway that aggregates physical security alarm system data and data from a plurality of sensors and devices connected to a wired/wireless network into one or more collection points (e.g., local database, remote monitoring station etc.).

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

BRIEF DESCRIPTION OF THE DRAWINGS

Figure 1:
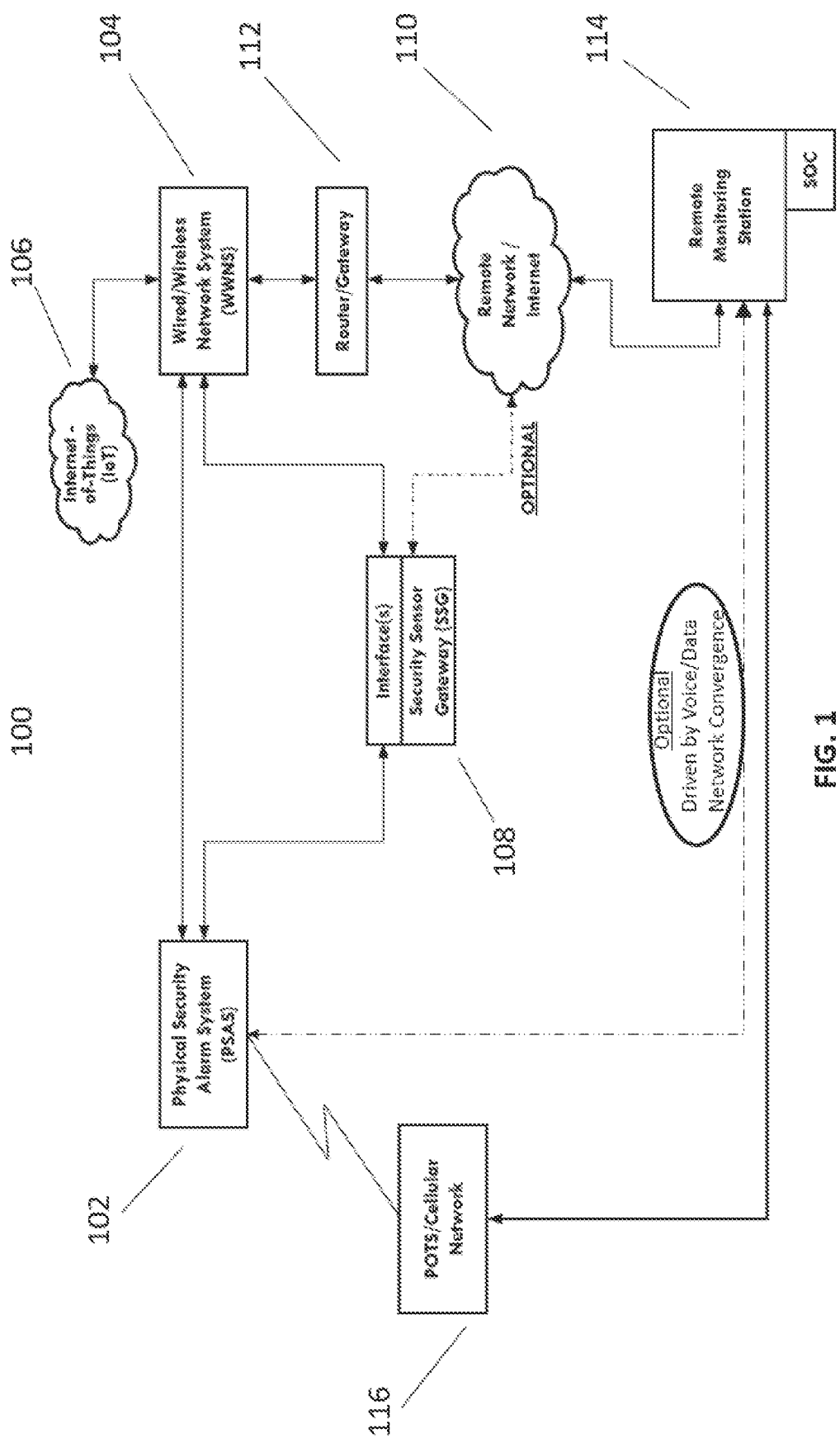
FIG. 1 is a block diagram illustration of a physical and cyber integrated security-intrusion detection system (PCIS-IDS) constructed in accordance with embodiments of the present invention.

Prior to discussing the drawings of the present disclosure at length, several terms and concepts are covered to facilitate the detailed description of the exemplary embodiments depicted in the drawings. It is noted that however that these terms and concepts do not limit the disclosure and that one of ordinary skill in the relevant art(s) will readily recognize modifications and changes applicable to the following ancillary systems and/or concepts that do not limit the scope of the present teachings.

A need exists for innovations in security systems that holistically address both cyber and physical intrusions into homes, facilities and premises with the capability to routinely or ad-hoc alert home/facility/premise owners and, where enabled, defend home/facility/premise systems against the remote intruder.

An object of the embodiments is to overcome inherent vulnerabilities in existing and future home/facility/premise-based physical security and computer network systems including a lack of visibility into routine and non-routine ingress and egress activities which can often lead to exfiltration of system owner assets and data and/or the launch of attacks against remote hosts from an unwitting owners' home/facility/premise.

The embodiments also provide a capability where home/facility/premise owners or a monitoring center operating on their behalf can monitor, detect, report on and manage intrusions into the home/facility/premise regardless of whether such intrusions be via physical access or thru cyber space. Such monitoring and management will provide a framework that enables home/facility/premise owners to have access to and maintain an ingress/egress baseline-physical and cyber-pertaining to their home/facility/premise and to have anomalies to such baselines easily detectable and triaged.

Yet other embodiments provide an enhanced alarm and intrusion detection capability that enhances state-of-the-practice security systems while also being future-proof and integrating physical security and cyber security monitoring in homes/premises to ensure security even in environments where all physical security sensors and control panels, door locks, garage doors leverage wired and wireless computer networks along with typical network and IoT devices.

FIG. 1 is an exemplary block diagram illustration of a physical and cyber integrated security intrusion detection system (PCIS-IDS) 100 constructed in accordance with the embodiments. The PCIS-IDS 100 includes a home/facility/premise-based wired or wireless physical security alarm system (PSAS) 102 and a home/facility/premise-based wired or wireless network system (WWNS) 104.

In the exemplary embodiment of FIG. 1, the WWNS 104 is electrically coupled to IoT components 106, a security sensor gateway (SSG) 108, and to remote network 110 or the Internet via a gateway/router 112, all with remote connectivity to a remote monitoring station (RMS) 114. The RMS 114 is configured to monitor, profile, and alert home/facility/premise owners of ingress, egress, incidents, anomalies, intrusions and other pertinent activities within their security system environment and home/facility/premise. The PCIS-IDS 100 may also include a plain old telephone system (POTS) 116 electrically coupled to the RMS 114.

In an alternative embodiment, the RMS may also function in a defensive role against active attack/intrusions if so enabled. Network activity and sensor data on the PSAS and the WWNS 114 and IoT components 106 can be monitored, logged and profiled by the SSG 108. The RMS 114 interfaces and interacts with the SSG 108 to monitor, profile, optionally defend, and alert system owners to systems events including ingress, egress, anomalies, intrusions and other pertinent activities within their security system environment and home/facility/premise.

In the exemplary embodiment of FIG. 1, the SSG 108 is a device that interfaces with the WWNS 104, the IoT components 106, and the PSAS 102 via a wired or wireless network connection or a serial interface. In an alternative embodiment, the SSG 108 may also be configured to additionally serve as the primary gateway/router 112 on the WWNS 104.

The SSG 108 includes the capability to monitor all network traffic traversing the entire WWNS 104 to read all intrusion (ingress/egress) activity on the PSAS 102 and to chronicle and profile all such activities/traffic within a local database.

The local database may be synchronized with a master database at the RMS 114 enabling the RMS to perform its critical monitoring, alerting and defend functions and to provide a consolidated periodic system monitoring report to system owners on activities and incidents within their security environment. The SSG 108 may be optionally programmed to provide system defense, triage, and/or recovery functions for the PSAS sensors and control panel as well as for devices connected to the WWNS 104 and the IoT components 106.

The SSG database is comprised of all data pertaining to and related to all devices on the PSAS 102 and the WWNS 104 as well as data and links to data from a host of third-party sources including internet domain name registrars (such as WHOIS data), IP address geolocation data and API, and security threat intelligence feeds from public and private threat feed providers.

Other embodiments include an integrated physical security and cyber security intrusion and anomaly detection method for determining physical or electronic ingress/egress of a person/device and/or data/information from a home/facility/premise. The method includes processing data and information obtained from physical security system sensors, wired/wireless network traffic, and third-party sources, and creating sensor and network traffic profile, baselines and detecting anomalies and writing all related data to either a local database or a remotely managed database at a monitoring center.

A computer-implemented method is provided, wherein the profile traffic creation comprises the following pertaining to devices/sensors/assets on connected networks: discovery and logging of all active devices/assets on connected networks, discovery and logging of all network protocols and ports typically employed on connected networks. Also provided is categorization of network traffic on connected networks into types based on TCP/IP protocols and/or ports employed (WWW, DNS, FTP, SSL, etc.) or based on application type (i.e., IoT, industrial control systems/ICS, and physical access control system PACS).

Additional aspects of the computer-implemented method include discovery and logging of all device/asset network vulnerabilities based on generally known or third-party sources of information, including chronicling of traffic patterns from all sensors and devices on connected networks including (a) all egress/ingress activity by device and related network addresses, (b) traffic volumes logged by time/period of day, and (c) traffic volume logged by remote system egress/ingress activity.

Network activity is logged by DNS owners (obtained via WHOIS or other Internet Registration Database) of remote systems, and network activity logged by geography from geo-location of network and TCP/IP addresses of remote systems, (f) all DNS traffic logged by local hosts and remote hosts, and (g) network activity logged by sites and systems including those employing Secure Sockets Layer or other encrypted communications.

Network activity baselines for each sensor and/or device on connected networks based on traffic profiles is determined. Additional functions include providing physical or cyber intrusion alerts and/or other anomalous activity detection alerts via analysis of real-time system/network activity data compared to activity baselines, providing network alerts via analysis of real-time cyber threat data received from network or third-party sources compared to real-time network activity.

In the embodiments, traffic profile data is stored in an embedded object-oriented or relational database located on the SSG and/or in cloud storage at an RMS that manages physical or cyber activity for homes/facilities/premises to enable remote monitoring, alerting, and proactive defense.

In yet additional embodiments, a computer-implemented method is provided, wherein the network profiles and all related information are implemented on the SSG. In the computer-implemented method, the SSG also includes the following pertaining to devices/sensors/assets and activity on connected networks:
(1) interfaces to physical security alarm system panels including the ability to read sensor codes to profile and monitor physical ingress/egress and environmental sensor activity,
(2) synchronizing of database information, in real-time or batch mode, with a RMS database,
(3) management communications optionally encrypted via PKI-enabled secure sockets layer including via use of an integral Trusted Platform Module chip,
(4) out-of-band management via optional cellular network (3G/4G/5G) interface to prevent hackers from observing management activity,
(5) integral virtual private network and/or virtual local area network to segregate management traffic from data traffic related to the SSG,
(6) termination of secure sockets layer sessions to enable inspection of encrypted traffic payloads and re-initiation of the SSL sessions to complete communications with remote destinations, and
(7) automated protocol parsing with embedded protocol libraries to enable real-time or near-real-time protocol analysis or deep packet inspection.

Figure 2:
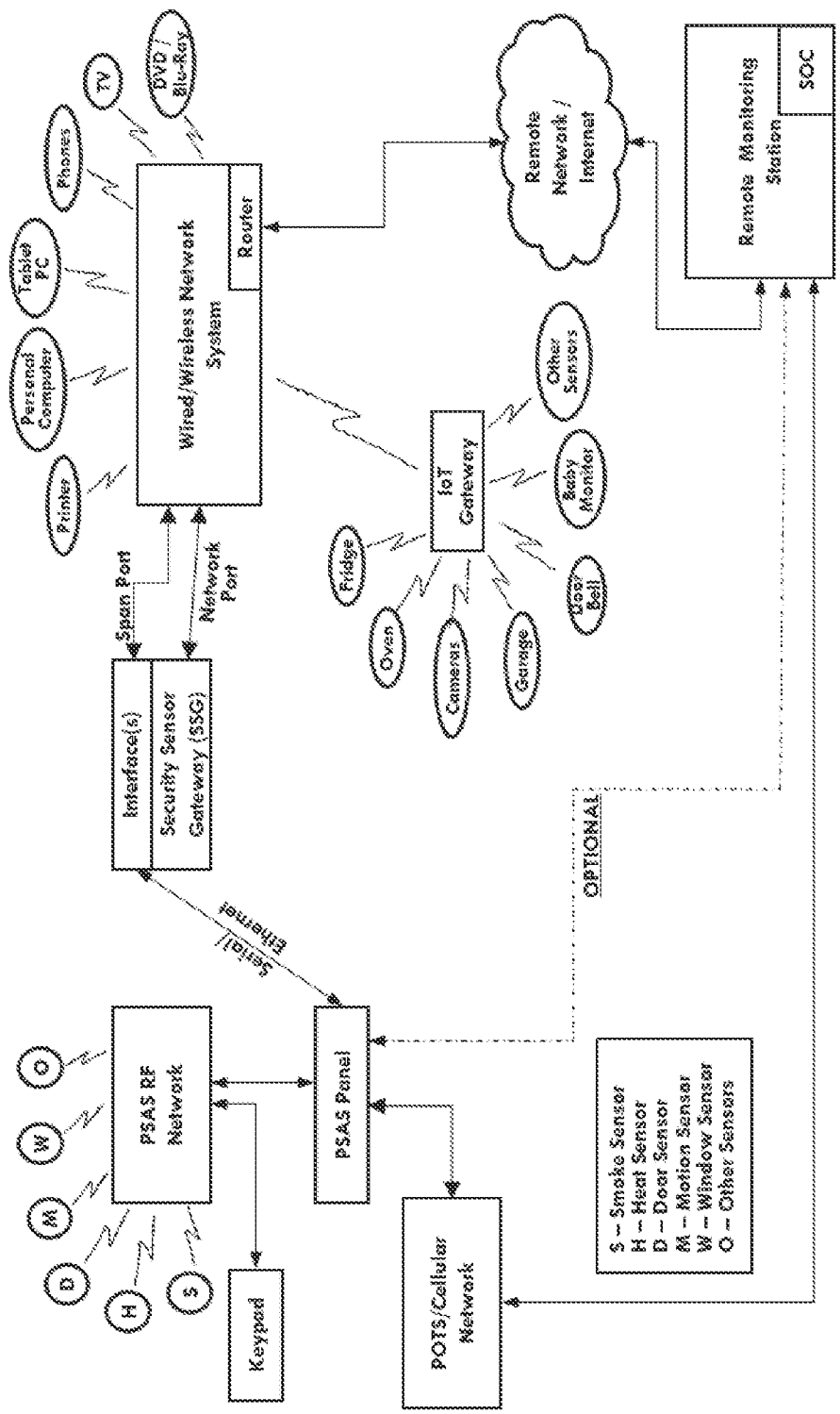
FIG. 2 is a more detailed block diagram illustration of the PCIS-IDS system depicted in FIG. 1.

A computer-implemented method is provided, wherein the detection of anomalies in network activity pertaining to devices/sensors/assets on connected networks comprises the use of traffic patterns and baselines, analyzed by artificial intelligence algorithms, to detect local network activity with devices on known blacklisted remote networks. Also detected is suspicious egress activity by devices/sensors/assets on connected networks, suspicious ingress activity from remote networks, and local network activity by a suspicious device/sensor/asset. FIG. 2 is a more detailed block diagram illustration 200 of the system 100 of FIG. 1.

Figure 3:
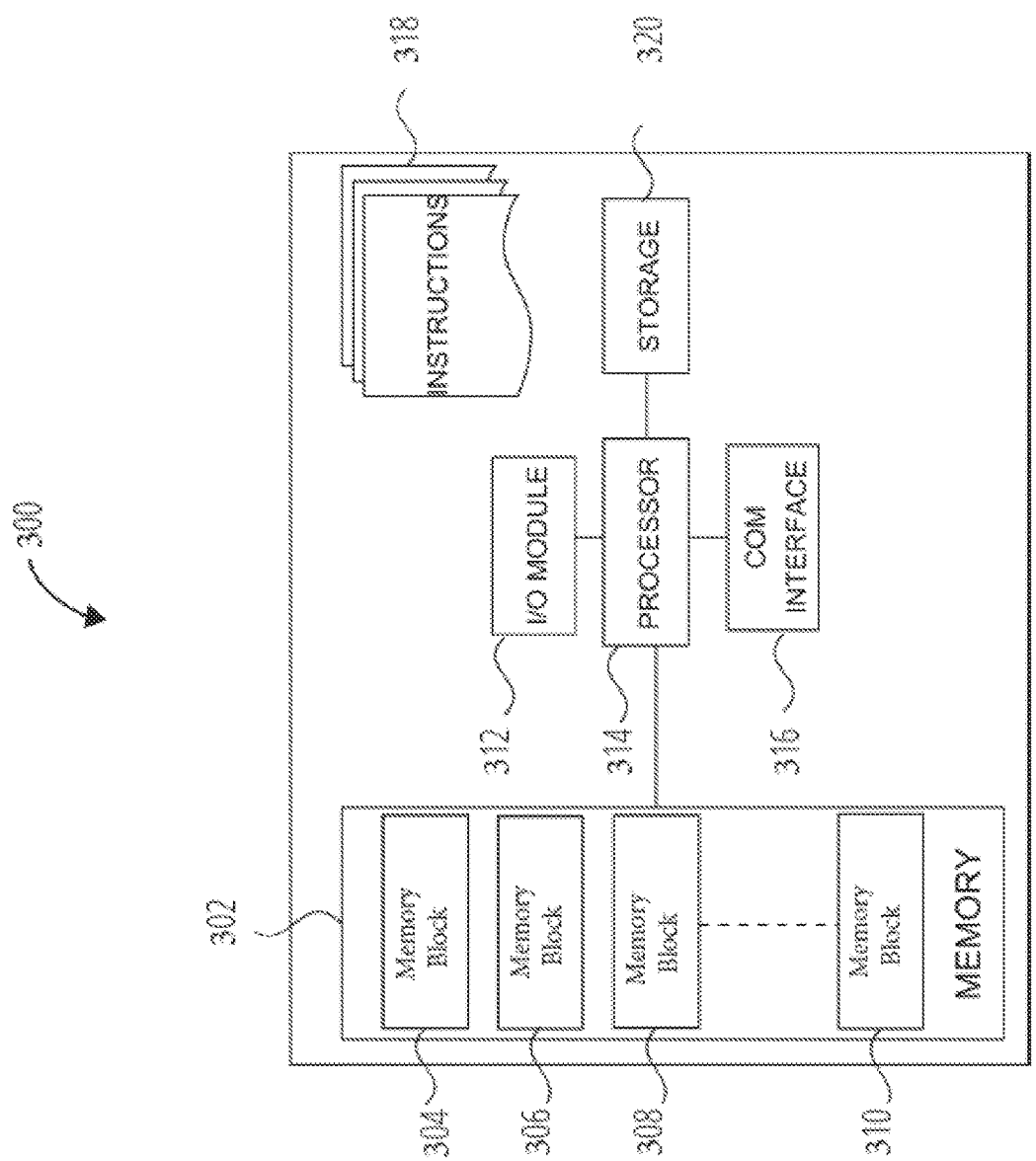
FIG. 3 is an exemplary computer system on which embodiments of the present invention may be implemented.

FIG. 3 is an exemplary block diagram illustration of a computer system 300 including an application-specific processor 314 configured to perform tasks related to security monitoring and processing, in accordance with the embodiments. The processor 314 has a specific structure imparted by instructions stored in a memory 302 and/or by instructions 318 that can be fetched by the processor 314 from a storage 320. The storage 320 may be co-located with the processor 314, or it may be located elsewhere and be communicatively coupled to the processor 314 via a communication interface 316, for example.

The system 300 can be a stand-alone programmable system, or it can be a programmable module located in a much larger system. For example, the system 300 can be part of a distributed monitoring system configured to manage security sensors or other components. The processor 314 may include one or more hardware and/or software components configured to fetch, decode, execute, store, analyze, distribute, evaluate, and/or categorize information. Furthermore, the processor 314 can include an I/O module 312 that can be configured to ingest data pertaining to single assets or fleets of assets.

The processor 314 may include one or more processing devices or cores (not shown). In some embodiments, the processor 314 may be a plurality of processors, each having one or more cores. The processor 314 can be configured to execute instructions fetched from the memory 302, i.e., from one of memory block 304, memory block 306, memory block 308, and memory block 310.

Furthermore, without loss of generality, the storage 320 and/or the memory 302 may include a volatile or non-volatile, magnetic, semiconductor, tape, optical, removable, non-removable, read-only, random-access, or any type of non-transitory computer-readable computer medium. The storage 320 and/or the memory 302 may include programs and/or other information that may be used by the processor 314 to perform tasks consistent with those described herein.

For example, the processor 314 may be configured by instructions from the memory blocks 306, 308, 310 to perform various operations related to security/intrusion detection systems described herein. Furthermore, the storage 320 may be configured to log data processed, recorded, or collected during the operation of the processor 314. The data can be time-stamped, location-stamped, cataloged, indexed, or organized in a variety of ways consistent with data storage practice.

Those skilled in the relevant art(s) will appreciate that various adaptations and modifications of the embodiments described above can be configured without departing from the scope and spirit of the disclosure. Therefore, it is to be understood that, within the scope of the appended claims, the teachings featured herein may be practiced other than as specifically described herein.

What is claimed is:
1. A method for an integrated physical security and cyber security intrusion and anomaly detection system for deter- mining physical or electronic ingress or egress of a person or device and/or data or information from a home, facility or premise, the method comprising:

detecting, via a wired or wireless network system (WWNS) coupled to a physical security alarm system (PSAS) and Internet of Things (IoT) components real-time (IoT), intrusion activity and network traffic and intrusion activity;

processing data and information obtained from physical security system sensors, wired or wireless network traffic, and third-party sources;

creating, based on the data and information, a plurality of sensor and network traffic profiles, the sensor and network traffic profiles including active devices and network protocols;

wherein the creating includes (i) discovery and logging of the active devices on a plurality of connected networks (ii) discovery and logging of all network protocols on the connected networks and (iii) categorizing the wired or wireless network traffic into types based on a plurality of Transmission Control Protocol/Internet Protocols (TCP/IP);

establishing a plurality of network activity baselines for each of the physical security system sensors, each of the IoT components and the WWNS based on the sensor and network traffic profiles;

detecting anomalies and writing all related data to either a local database or a remotely managed database at a monitoring center; and providing activity alerts based on comparing the detected real-time IoT intrusion activity, and the network and traffic intrusion activity, to a respective one or more of the plurality of network activity baselines.

2. The method of claim 1, wherein the data and information obtained from the physical security system sensors include real-time intrusion activity.

3. The method of claim 1, further including monitoring, via a security sensor gateway (SSG), traffic and detecting anomalies on the WWNS by analyzing the real-time intrusion activity sensed by the physical security system sensors, and the detected network traffic and intrusion activity.

4. The method of claim 3, wherein the plurality of sensor and network traffic activity profiles are based on the analyzed sensed real-time intrusion activity and the analyzed network traffic and intrusion activity.

5. The method of claim 3, wherein the monitoring traffic, the detecting anomalies, the creating a plurality of sensor and network intrusion traffic activity profiles, the establishing a network activity baseline, and the providing activity alerts are performed within the SSG.

6. The method of claim 5, wherein the SSG aggregates data from the integrated physical security and cyber security intrusion and anomaly detection system and data from a plurality of sensors and devices connected to the WWNS into one or more collection points.

7. The method of claim 6, wherein the SSG is configured to compare the monitored traffic and the intrusion activity with each network activity baseline produces a threat anomaly detection level.

8. The method of claim 7, wherein the SSG is configured to trigger a security alert when the threat anomaly detection level exceeds a predetermined threshold.

9. The method of claim 8, wherein a remote monitoring station (RMS) is responsive to the triggered security alert.

10. The method of claim 9, wherein the local database is synchronized with a master database at the RMS, enabling the RMS to perform its critical monitoring, alerting and defend functions and to provide a consolidated periodic system monitoring report to system owners on activities and incidents within a security environment.

11. The method of claim 10, wherein the SSG is programmed to provide system defense, triage, and/or recovery functions for a plurality of PSAS sensors and a control panel as well as for a plurality of devices connected to the WWNS and the IoT components.

12. The method of claim 11, wherein The RMS is configured to monitor, profile, and alert home, facility or premise owners of ingress, egress, incidents, anomalies, intrusions and other pertinent activities within a security system environment and the home, facility or premise.

13. The method of claim 12, wherein the RMS interfaces and interacts with the SSG to monitor, profile, optionally defend, and alert system owners to a plurality of system events.

14. The method of claim 13, wherein the plurality of system events include ingress, egress, anomalies, intrusions and other pertinent activities within the security system environment of the alert system owners.

15. The method of claim 1, wherein the plurality of sensor and network traffic profiles include egress/ingress activity and a traffic type and a traffic volume.

* * * * *